(12) United States Patent
Fujishima et al.

(10) Patent No.: US 8,600,542 B2
(45) Date of Patent: Dec. 3, 2013

(54) METHOD OF AND APPARATUS FOR CONTROLLING MACHINE TOOL FOR RESTARTING AUTOMATIC OPERATION

(75) Inventors: Makoto Fujishima, Nara (JP); Hideki Takedomi, Nara (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 200 days.

(21) Appl. No.: 12/960,763

(22) Filed: Dec. 6, 2010

(65) Prior Publication Data

US 2011/0190915 A1 Aug. 4, 2011

(30) Foreign Application Priority Data

Jan. 29, 2010 (JP) .................................. 2010-018215

(51) Int. Cl.
*G06F 19/00* (2011.01)
(52) U.S. Cl.
USPC .......................................... 700/177; 700/179
(58) Field of Classification Search
USPC .......... 700/159, 169, 177, 178, 179, 191, 192
See application file for complete search history.

(56) References Cited

U.S. PATENT DOCUMENTS

2006/0149411 A1\* 7/2006 Kochiya et al. ............... 700/160
2008/0103625 A1 5/2008 Mochida et al.

FOREIGN PATENT DOCUMENTS

| JP | 2000-35815 | 2/2000 |
| JP | 2006-172388 | 6/2006 |
| JP | 2008-134983 | 6/2008 |

OTHER PUBLICATIONS

Proctor et al., "Canonical Machining Commands", National Institute of Standards and Technology, Jan. 30, 1997.\*
Notice of Grounds of Rejection mailed Aug. 20, 2013 in counterpart application No. 2010-018215 with English translation.

\* cited by examiner

*Primary Examiner* — Carlos Ortiz Rodriguez
(74) *Attorney, Agent, or Firm* — Kratz, Quintos & Hanson, LLP

(57) ABSTRACT

A machine tool controlled to restart automatic operation for machining a workpiece from an interrupted point after the machine tool, which has been automatically operated by NC program commands, is caused to interrupt the automatic operation. The NC program commands are classified into a plurality of main groups with respect to the contents of motions for changing the machine state of the machine tool. When the automatic operation of the machine tool restarts after the automatic operation has been interrupted halfway, an order of execution of the NC program commands is determined such that the main groups are arranged in a prescribed order of execution, for automatically generating a machine state restoration command. The automatic operation of the machine tool can restart from the interrupted point without the need for the operator to manually generate or correct a command for restoring the machine tool to its machine.

3 Claims, 4 Drawing Sheets

METHOD OF AND APPARATUS FOR CONTROLLING MACHINE TOOL FOR RESTARTING AUTOMATIC OPERATION

BACKGROUND OF THE INVENTION

1. Field of the Invention

The present invention relates to a method of and an apparatus for controlling a machine tool to restart its automatic operation for machining a workpiece from an interrupted point after the machine tool, which has been automatically operated by NC (Numerical Control) program commands output from an NC apparatus, is caused to interrupt its automatic operation.

2. Description of the Related Art

Japanese published patent application No. 2000-35815 discloses a numerically controlled machine tool. The disclosed machine tool performs a sequence of machine motions such as for a tool changing process with a single sub-command (auxiliary command). After the execution of the sub-command is interrupted due to a fault during the sequence of machine motions, the numerically controlled machine tool can subsequently restart the execution of the sub-command.

Specifically, when the execution of the sub-command, which is described in a machining program, is interrupted while the sub-command is being executed, then the operator determines whether the sub-command needs to be corrected or not in order to restart the execution of the sub-command.

If the sub-command needs to be corrected, then the operator corrects the sub-command. However, correcting the sub-command requires the operator to have a certain level of skill, and has been burdensome for the operator.

SUMMARY OF THE INVENTION

It is an object of the present invention to provide a method of and an apparatus for controlling a machine tool to restart its automatic operation for machining a workpiece from an interrupted point after the machine tool, which has been automatically operated by NC program commands output from an NC apparatus, is caused to interrupt its automatic operation. The machine tool can restart the automatic operation from the interrupted point without the need for the operator of the machine tool to manually generate or correct a command for restoring the machine tool to its machine state upon interruption and also with safety free from physical interference between the workpiece and a tool during their movement.

To achieve the above object, there is provided in accordance with the present invention a method of controlling a machine tool to restart automatic operation thereof for machining a workpiece from an interrupted point after the machine tool, which has been automatically operated by NC program commands output from an NC apparatus, is caused to interrupt the automatic operation halfway, comprising the steps of:

classifying the NC program commands into a plurality of main groups with respect to the contents of motions for changing the machine state of the machine tool by the NC program commands; and determining an order of execution of the NC program commands such that the main groups are arranged in a prescribed order of execution, for automatically generating a machine state restoration command, when the automatic operation of the machine tool restarts after the automatic operation has been interrupted halfway.

According to a preferred embodiment, when the machine tool is automatically operated to machine the workpiece, the main groups comprise at least one of:

a first group including at least one sub-group having an NC program command for retracting a component which would otherwise become an obstacle to a movable axis of the machine tool when the movable axis moves;

a second group including at least one sub-group having an NC program command for clamping and unclamping the movable axis;

a third group including a sub-group having an NC program command not included in the other main group, among commands required to restore the machine state of the machine tool;

a fourth group including at least one sub-group having an NC program command for rotating a main spindle on which a tool or the workpiece is mounted; and a fifth group including at least one sub-group having an NC program command for making an action immediately before the automatic operation restarts.

Preferably, when the automatic operation of the machine tool restarts after the automatic operation has been interrupted halfway, the order of execution of the NC program commands is determined such that the main groups are arranged in the order of the first group, the second group, the third group, the fourth group and the fifth group, for automatically generating the machine state restoration command.

When the machine tool is automatically operated in an idle mode in which the machine tool does not machine the workpiece, the main groups comprise:

a first group including at least one sub-group having an NC program command for retracting a component which would otherwise become an obstacle to a movable axis of the machine tool when the movable axis moves; and a second group including at least one sub-group having an NC program command for clamping and unclamping the movable axis.

In this case, when the automatic operation of the machine tool restarts after the automatic operation has been interrupted halfway, the order of execution of the NC program commands is determined such that the main groups are arranged in the order of the first group and the second group, for automatically generating the machine state restoration command.

There is also provided in accordance with the present invention an apparatus for controlling a machine tool to restart automatic operation thereof for machining a workpiece from an interrupted point after the machine tool, which has been automatically operated by NC program commands output from an NC apparatus, is caused to interrupt the automatic operation halfway, the apparatus comprising:

a machine state restoration command generating device for outputting a machine state restoration command based on which the machine tool restarts the automatic operation on the workpiece from the interrupted point; and the machine state restoration command generating device comprising:

a machine state storage unit for storing the machine state of the machine tool;

a main group storage unit for storing a plurality of main groups into which NC program commands are classified with respect to the contents of motions for changing the machine state of the machine tool according to the NC program commands;

an output-signal-upon-interruption storage unit for storing an output signal upon interruption of the machine state which is output from the NC apparatus; and a machine state restoration command generator for arranging the main groups output from the main group storage unit according to a prescribed order of execution based on data of the machine state output from the machine state storage unit and based on an output signal upon interruption of the machine state which is output from the output-signal-upon-interruption storage unit, for automatically generating the machine state restoration command, and for outputting the generated machine state restoration command to the NC apparatus, when the automatic operation of the machine tool restarts after the automatic operation has been interrupted halfway.

According to a preferred embodiment, when the automatic operation of the machine tool restarts after the automatic operation has been interrupted halfway, the machine state restoration command generator determines the order of execution of the NC program commands such that the main groups output from the main group storage unit are arranged in the order of the first group, the second group, the third group, the fourth group and the fifth group, for automatically generating the machine state restoration command.

The machine tool may be automatically operated in an idle mode in which the machine tool does not machine the workpiece. In this case, when the automatic operation of the machine tool restarts after the automatic operation has been interrupted halfway, the machine state restoration command generator determines the order of execution of the NC program commands such that the main groups output from the main group storage unit are arranged in the order of the first group and the second group, for automatically generating the machine state restoration command.

The machine state restoration command generating device may be provided outside of the NC apparatus independently thereof.

With the above described method of and apparatus for controlling the machine tool to restart its automatic operation according to the present invention, after the automatic operation of the machine tool according to the NC program commands is interrupted halfway, the machine tool can restart its automatic operation for machining a workpiece from the interrupted point without the need for the operator to manually generate or correct a command for restoring the machine tool to its machine state upon interruption and also with safety free from physical interference while the workpiece and a tool move.

DESCRIPTION OF THE PREFERRED EMBODIMENTS

Figure 1:
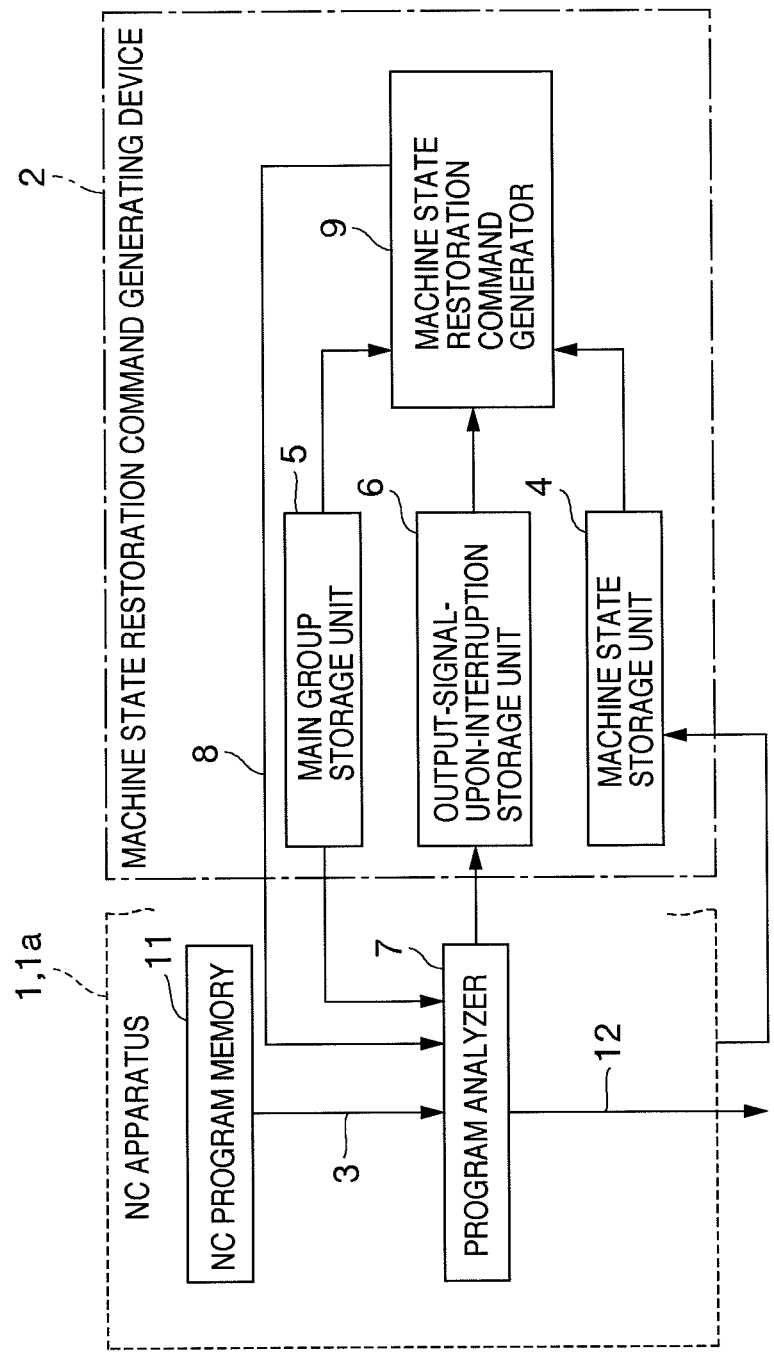
FIG. 1 is a block diagram of an apparatus for controlling a machine tool to restart its automatic operation according to an embodiment of the present invention.

In a method of controlling a machine tool to restart its automatic operation according to the present invention, the machine tool is automatically operated by NC program commands output from an NC apparatus. According to the method, the machine tool can restart its automatic operation from an interrupted point in an NC program after the machine tool has been caused to interrupt its automatic operation halfway.

The "automatic operation" of the machine tool refers to a sequence of machine motions of the machine tool which is controlled to operate in a prescribed sequence by the NC program commands output from the NC apparatus.

The machine tool may be caused to interrupt its automatic operation for machining workpieces on different occasions. On one occasion, the machine tool which has been machining a workpiece stops its machining process halfway at the closing time of the day, and will perform the rest of the machining process on the workpiece next day. In another case, the machine tool is forced to stop its automatic operation due to a fault in a sequence of its machine motions.

According to the above method, the NC program commands are classified into a plurality of main groups with respect to the contents of motions for changing the machine state of the machine tool by the NC program commands. When the automatic operation of the machine tool restarts after the automatic operation has been interrupted halfway, an order of execution (sequence) of the NC program commands is determined such that the main groups are arranged in a prescribed order of execution, for automatically generating a machine state restoration command.

An apparatus for carrying out the above method according to the present invention is capable of controlling the machine tool to restart its automatic operation from an interrupted point in the NC program based on an output signal from a machine state restoration command generating device after the automatic operation has been interrupted halfway.

The machine state restoration command generating device comprises a machine state storage unit for storing the machine state of the machine tool, a main group storage unit for storing a plurality of main groups into which NC program commands are classified with respect to the contents of motions for changing the machine state of the machine tool according to the NC program commands, an output-signal-upon-interruption storage unit for storing an output signal upon interruption of the machine state which is output from the NC apparatus, and a machine state restoration command generator.

When the automatic operation of the machine tool restarts after the automatic operation has been interrupted halfway, the generator arranges the main groups output from the main group storage unit according to a prescribed order of execution based on data of the machine state output from the machine state storage unit and an output signal upon interruption of the machine state which is output from the output-signal-upon-interruption storage unit. The machine state restoration command is also automatically generated and is output to the NC apparatus.

The above method and apparatus thus constructed are capable of achieving the object of the present invention. Namely, with the method of and the apparatus for controlling the machine tool to restart its automatic operation, after the automatic operation of the machine tool according to the NC program commands is interrupted halfway, the machine tool can restart its automatic operation for machining a workpiece from an interrupted point without the need for the operator to manually generate or correct a command for restoring the machine tool to its machine state upon interruption and also with safety free from physical interference while the workpiece and a tool move.

The machine tool controlled by the method and apparatus according to the present invention may be a lathe, a machining center, a multi-axis turning center, a turning machine, or the like.

Apparatus for and method of controlling a machine tool to restart its automatic operation according to embodiments of the present invention will be described in detail below with reference to FIGS. 1 through 4.

Like or corresponding parts are denoted by like or corresponding reference characters throughout views.

FIG. 1 is a block diagram of the apparatus for controlling the machine tool. As shown in FIGS. 1 through 4, a machine tool according to the present invention is automatically operated by NC program commands output from NC apparatus 1, 1a. The machine tool is automatically operated in a machining mode in which the machine tool machines a workpiece and an idle mode in which the machine tool does not machine a workpiece.

The machine tool has a function to restart its automatic operation from an interrupted point P on an output signal from a machine state restoration command generating device 2 after the machine tool is caused to interrupt its automatic operation.

According to the above function, the machine state of the machine tool and the internal states of the NC apparatus 1, 1a are set to the state of a block of an NC program 3 upon restart, i.e., a program block which is the same as a block of the NC program 3 upon interruption. The NC program 3 can thus be executed again from the interrupted point P in the NC program 3.

Figure 2:
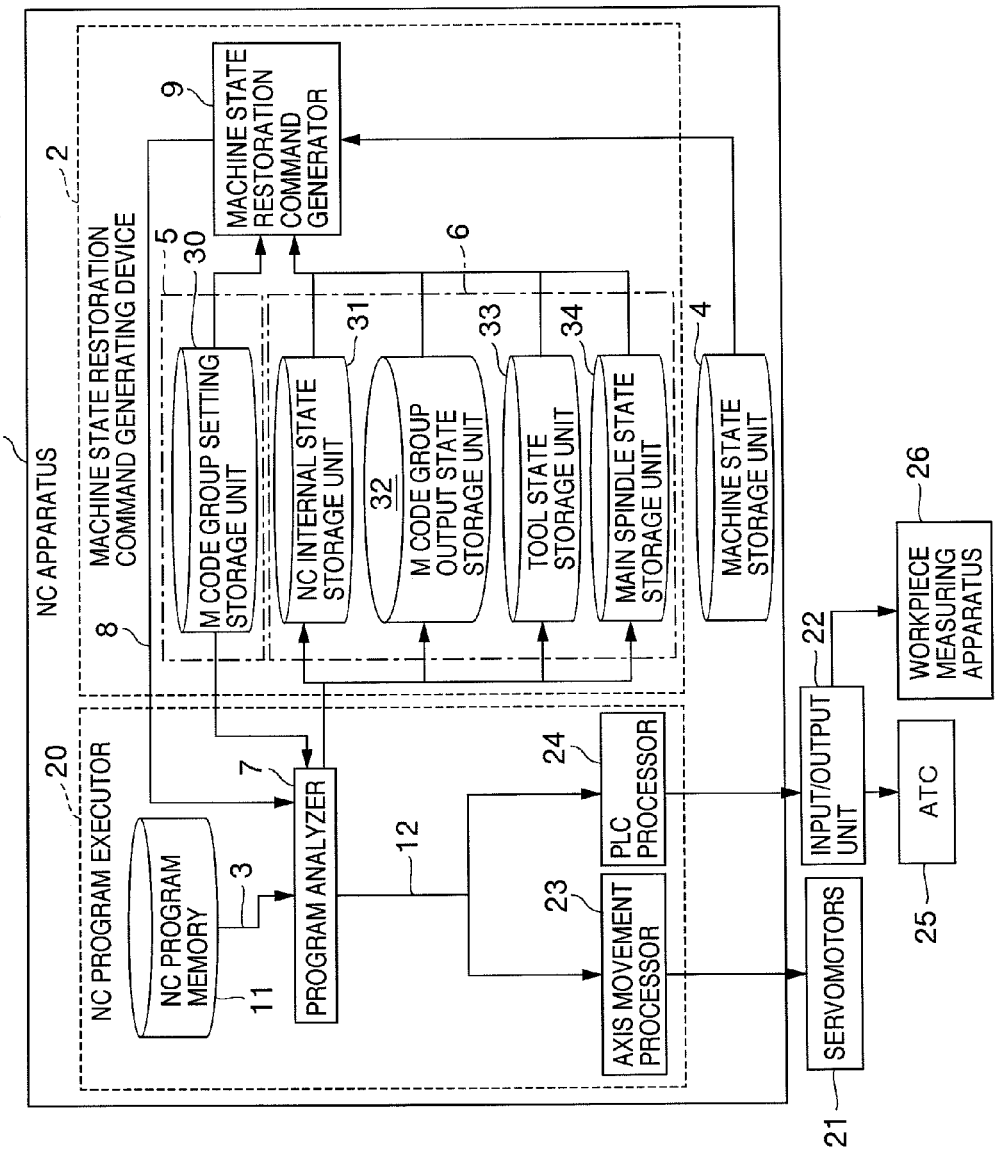
FIG. 2 is a detailed block diagram of the apparatus for controlling the machine tool to restart its automatic operation according to the embodiment of the present invention.
Figure 3:
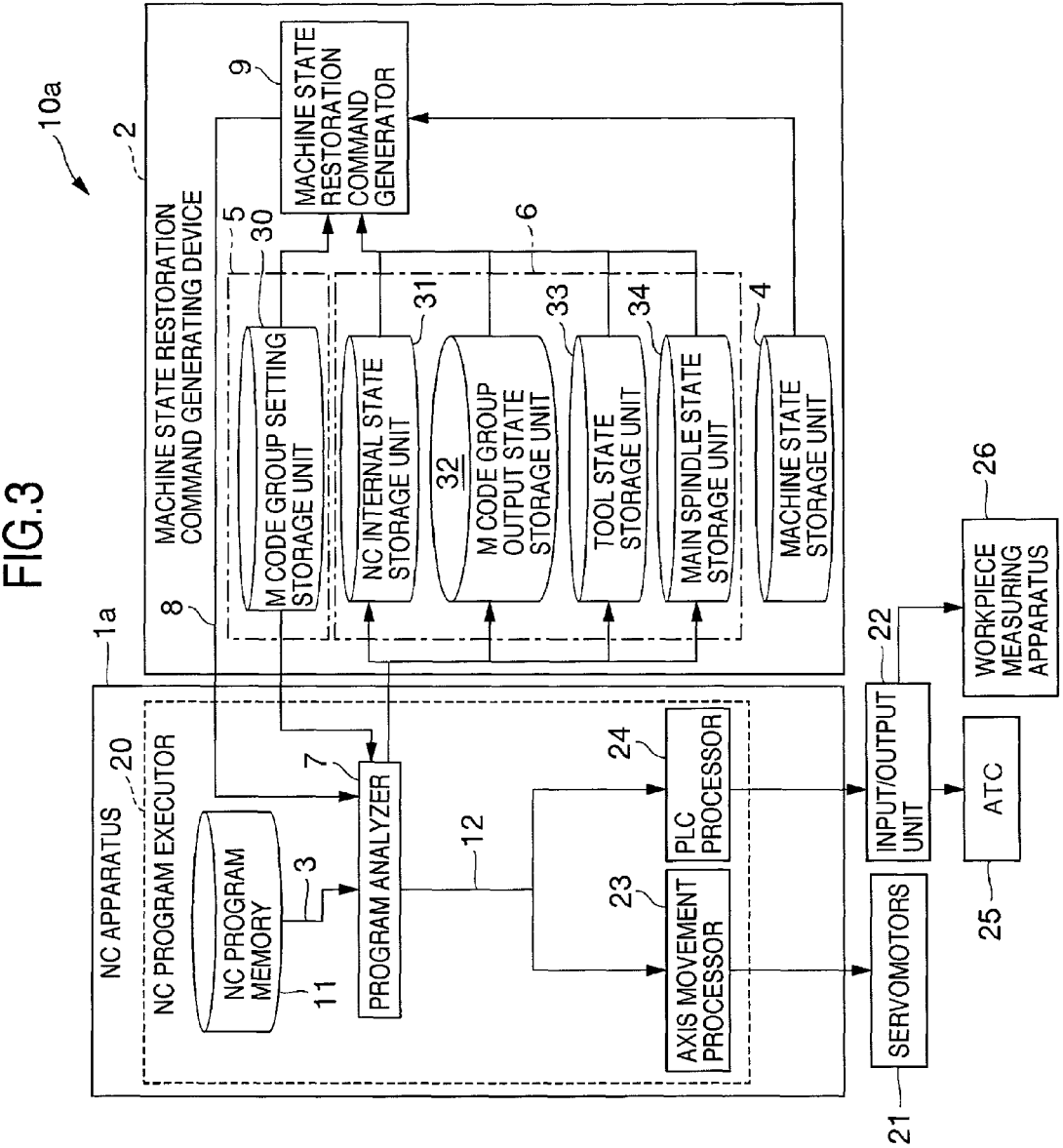
FIG. 3 is a detailed block diagram of the apparatus for controlling the machine tool to restart its automatic operation according to a modification of the embodiment.

FIG. 2 shows in detailed block form a control apparatus 10 which has a system configuration wherein the machine state restoration command generating device 2 is disposed in the NC apparatus 1. FIG. 3 shows in detailed block form a control apparatus 10a which has a system configuration wherein the machine state restoration command generating device 2 is disposed outside the NC apparatus 1a.

The internal states of the NC apparatus 1, 1a can be restored by automatically setting a block of an NC program 3 upon restart (hereinafter referred to as "restarting block"). The restarting block is the same state as a block of the NC program 3 upon interruption (hereinafter referred to as "interrupted block").

The function to restart the NC program 3 includes processes (1), (2) and (3), shown below, for restoring the internal states of the NC apparatus 1, 1a.

Process (1): First, the state of the restarting block is acquired.

Process (2): Then, it is set to the state of the restarting block.

Process (3): Finally, the automatic operation restarts.

In order to acquire the restarting block whose state is the same as the interrupted block, the NC apparatus 1, 1a carry out a process of scanning the NC program 3 from its start to the interrupted block. According to the above processes of the NC program restarting function, the internal states of the NC apparatus 1, 1a upon restart are restored to the same states as the internal states of the NC apparatus 1, 1a upon interruption.

For restoring the machine state of the machine tool to the same state as the state upon interruption, it is necessary to change the machine state to a restarting state with NC program commands. For example, it is necessary to move a main spindle and movable axes (feeding axes for including an X-axis, a Y-axis, a Z-axis, a B-axis, a C-axis, etc.) to a restarting position.

Codes for indicating motions to change the machine state of the machine tool include an M code, a T code and an S code. The M code is a code indicative of a start and stop of the main spindle and the movable axes, a program stop, an end of program, etc. The T code is a code indicative of a tool and matter related to the indicated tool. The S code is a code indicative of rotational speeds of the main spindle, etc.

The order of execution of NC program commands relative to the machine state of the machine tool may have to depend on the states of the tool, the workpiece and movable components. Heretofore, the operator is required to select NC program commands and the order of execution of the NC program commands.

Since the operator needs to have a high level of knowledge about NC program commands and machine motions for selecting NC program commands and the order of execution of the NC program commands, the operator is required to be highly skilled.

In the control method according to the present embodiment, the NC program commands are classified into a plurality of main groups with respect to the contents of motions for changing the machine state of the machine tool by the NC program commands. When the automatic operation of the machine tool restarts after the automatic operation has been interrupted halfway, the order of execution of the NC program commands is determined such that the main groups are arranged in a prescribed order of execution. In this manner, a machine state restoration command is automatically generated.

As a result, when the automatic operation of the machine tool restarts, the machine state of the machine tool is restored to the same state as the machine state upon interruption, i.e., the machine state of the restarting block.

The control apparatus 10, 10a for carrying out the above control method automatically operate the machine tool with commands of the NC program 3 which are output from the NC apparatus 1, 1a. The machine tool is automatically operated in a machining mode in which the machine tool machines the workpieces and in an idle mode in which the machine tool does not machine the workpieces.

After the machine tool is caused to interrupt its automatic operation, the machine tool can restart its automatic operation for machining the workpiece from the interrupted point P in the NC program 3 based on a machine state restoration command which is output from the machine state restoration command generating device 2.

The machine state restoration command generating device 2 includes a machine state storage unit 4, for storing the machine state of the machine tool, and a main group storage unit 5. The main group storage unit 5 stores a plurality of main groups into which NC program commands are classified with respect to the contents of motions for changing the machine state of the machine tool according to the commands of the NC program 3.

The generating device 2 also includes a machine state restoration command generator 9 and an output-signal-upon-interruption storage unit 6 for storing an output signal upon interruption of the machine state which is output from the NC apparatus 1, 1a (or more specifically, from a program analyzer 7 of the NC apparatus 1, 1a).

The machine state storage unit 4 stores the machine state of the machine tool, which is output from the NC apparatus 1, 1a, and outputs the data of the machine state to the machine state restoration command generator 9.

When the automatic operation of the machine tool restarts after the automatic operation has been interrupted halfway, the generator 9 arranges the main groups output from the main group storage unit 5 according to the prescribed order of execution based on the data of the machine state, which is output from the machine state storage unit 4, and based the output signal upon interruption of the machine state, which is output from the output-signal-upon-interruption storage unit 6, for automatically generating a machine state restoration command 8. The generated machine state restoration command 8 is output to the NC apparatus 1, 1*a*, or more specifically, to the program analyzer 7 of the NC apparatus 1, 1*a*.

According to the above control method and the control apparatus 10, 10*a* of the machine tool, when the automatic operation of the machine tool according to the NC program commands restarts after the automatic operation has been interrupted halfway, the operator does not need to manually generate or correct the machine state restoration command 8 for restoring the machine state to the same state as the machine state upon interruption.

Further, the automatic operation restarts from the interrupted point P with safety free from problems such as physical interference between the workpiece and the tool during their movement and such as a dropping of the workpiece.

According to the present embodiment, the NC program commands for indicating motions for changing the machine state of the machine tool are classified into five main groups including first through fifth groups.

Each of the main groups includes one or more sub-groups. In each of the main groups, the sub-group or sub-groups are assigned respective numbers. As a result, the NC program commands are output in the order of the numbers assigned to the sub-groups.

The first group includes at least one sub-group having an NC program command for retracting a component, e.g., a sensor for measuring the workpiece, which would otherwise become an obstacle to a movable axis of the machine tool when the movable axis moves.

The component which would otherwise become the obstacle tends to physically interfere with the movable axis when the movable axis moves, and hence tends to get in the way of the movable axis when the movable axis moves. The first group includes the NC program command for retracting the component. The component is retracted by being stored into a given position.

As the component which would otherwise become an obstacle is retracted by an M code in the first group, it is possible to avoid trouble such as damage to the tool and the workpiece and a dropping of the workpiece when the movable axis moves.

The second group includes at least one sub-group having an NC program command for clamping and unclamping a movable axis.

The second group sets therein an M code in a sub-group for clamping and unclamping each of movable axes and also sets therein an M code in another sub-group for connecting and disconnecting a movable axis.

The third group includes a sub-group having an NC program command not included in the other main groups (the first group, the second group, the fourth group and the fifth group), among commands required to restore the machine state of the machine tool.

The sub-group in the third group includes, for example, an M code in an NC program command for turning on a chamfering for a threading cycle.

The fourth group includes at least one sub-group having an NC program command for rotating the main spindle on which the tool or the workpiece is mounted. The sub-group in the fourth group includes an M code about the rotation of the main spindle. The M code is included in the NC program command for rotating and reversing the main spindle.

The fifth group includes at least one sub-group having an NC program command for making an action immediately before the automatic operation restarts, after the internal state of the machine tool has been confirmed.

The sub-group in the fifth group includes an M code about the supply of a coolant. For example, the fifth group includes a sub-group, including an M code for turning on and off the supply of the coolant, and a sub-group including an M code for turning on and off an air blow.

When the workpiece is machined by the machine tool which is automatically operated by the control method and the control apparatus 10, 10*a* of the machine tool according to the present invention, the main groups comprise at least one of the first group including at least one sub-group, the second group including at least one sub-group, the third group including the sub-group, the fourth group including at least one sub-group, and the fifth group including at least one sub-group.

When the automatic operation of the machine tool restarts after the automatic operation has been interrupted halfway, the machine state restoration command generator 9 determines the order of execution (sequence) of NC program commands such that the main groups, output from the main group storage unit 5, are arranged in the order of the first group, the second group, the third group, the fourth group and the fifth group. The machine state restoration command generator 9 thus automatically generates the machine state restoration command 8.

The generator 9 uses, in addition to the M codes in the first through fifth groups, a T code for selecting a tool, an S code for selecting a parameter such as a rotational speed of the main spindle, and the position of the restarting block. The generator 9 automatically generates the machine state restoration command 8 for restoring the restarting block which is of the same state as the interrupted block.

The generator 9 successively restores M codes which are required and sufficient to restore the machine state, in the order of descending importance. The generator 9 automatically generates the machine state restoration command 8 to achieve a safe machine state free from physical interference between the workpiece and the tool during their movement.

According to the above control method and the control apparatus 10, 10*a*, the machine tool may be automatically operated in the idle mode in which the machine tool does not machine the workpiece. In such a case, the main groups comprise the first group including at least one sub-group having an NC program command for retracting a component which would otherwise become an obstacle to a movable axis of the machine tool when the movable axis moves, and the second group including at least one sub-group having an NC program command for clamping and unclamping the movable axis.

In such a case, when the automatic operation of the machine tool restarts after the automatic operation has been interrupted halfway, the generator 9 determines the order of execution of NC program commands such that the main groups output from the main group storage unit 5 are arranged in the order of the first group and the second group, and the generator 9 automatically generates the machine state restoration command 8.

An M code for counting workpieces which are machined is not required for restoring the machine state, and hence does not belong to the above five main groups. Therefore, the M code for counting workpieces which are machined is ignored when the machine state is restored.

The control apparatus 10*a* shown in FIG. 3 includes the machine state restoration command generating device 2 which is provided outside of the NC apparatus 1a independently thereof. Therefore, the machine state restoration command generating device 2 can be designed and modified uniquely and freely without being limited by the design standards and configuration of the NC apparatus 1a.

The NC apparatus 1, 1a of the control apparatus 10, 10a shown in FIGS. 2 and 3, respectively, include an NC program executor 20.

The NC program executor 20 includes an NC program memory 11 for storing the NC program 3, and the program analyzer 7 which analyzes the NC program 3 stored in the NC program memory 11. The NC program executor 20 analyzes the NC program 3 and generates NC program commands 12 by the analyzer 7. The NC program commands 12 are processed by an axis movement processor 23 and then are output to servomotors 21 of the respective movable axes including the X-axis, the Y-axis, the Z-axis, the B-axis and the C-axis, thereby energizing the servomotors 21.

The NC program commands 12 generated by the program analyzer 7 are also processed by a PLC (Programmable Logic Controller) processor 24. The NC program commands 12 processed by the PLC processor 24 are output through an input/output unit 22 to various ancillary apparatus including an ATC (Automatic Tool Changer) 25 and a workpiece measuring apparatus 26. The machine tool is thus automatically operated to successively machine the workpiece.

The machine state restoration command generating device 2 of the control apparatus 10, 10a includes an M code group setting storage unit 30 as part of the main group storage unit 5.

The M code group setting storage unit 30 stores information for setting the classification of the main groups and for setting the sub-groups included in the main groups. The information stored in the M code group setting storage unit 30 is output to the program analyzer 7 and the machine state restoration command generator 9, respectively.

After the output-signal-upon-interruption storage unit 6 has stored an output signal upon interruption of the machine state which is output from the program analyzer 7, the storage unit 6 outputs the machine state upon interruption to the machine state restoration command generator 9. The storage unit 6 comprises an NC internal state storage unit 31, an M code group output state storage unit 32, a tool state storage unit 33 and a main spindle state storage unit 34.

The NC internal state storage unit 31 stores a command state in the NC apparatus 1, 1a. The command state is obtained by scanning the NC program 3 from its start to the interrupted block when the execution of the NC program 3 restarts after being interrupted.

For example, the NC internal state storage unit 31 stores the position of a program block (e.g., the position of the cutting edge of the tool) and a machining mode at the time the interrupted block is completed at the interrupted point P (i.e., immediately before the restarting block is executed).

The M code group output state storage unit 32 stores the final output M code of each sub-group when the interrupted block is completed at the interrupted point P, i.e., immediately before the restarting block is executed.

Specifically, the storage unit 32 stores whether either one of the clamping and unclamping processes in a sub-group, e.g., the clamping process, is at the ending state of the interrupted block, i.e., at the starting state of the restarting block, when the NC program 3 is scanned from its start to the interrupted block.

The M code of the final output is acquired by scanning the M codes in the restarted program while referring to the settings of the sub-group which are stored in the M code group setting storage unit 30.

The tool state storage unit 33 stores a tool mounted on the main spindle, i.e., a selected tool, when the interrupted block is completed, i.e., immediately before the restarting block is executed, and a tool positioned at a standby position at the time. The state of the selected tool and the state of the tool at the standby position are acquired by scanning the output of T codes and tool change commands in the NC program 3 to restart.

The main spindle state storage unit 34 stores a main spindle rotational speed command when the interrupted block is completed, i.e., immediately before the restarting block is executed. The main spindle rotational speed command is acquired by scanning the output of S codes in the NC program 3 to restart. The acquired main spindle rotational speed command is stored in the main spindle state storage unit 34.

The storage units 31, 32, 33, 34 are supplied with information representative of the machine states from the program analyzer 7. The information stored in the storage units 30, 31, 32, 33, 34 is output to the machine state restoration command generator 9.

Figure 4:
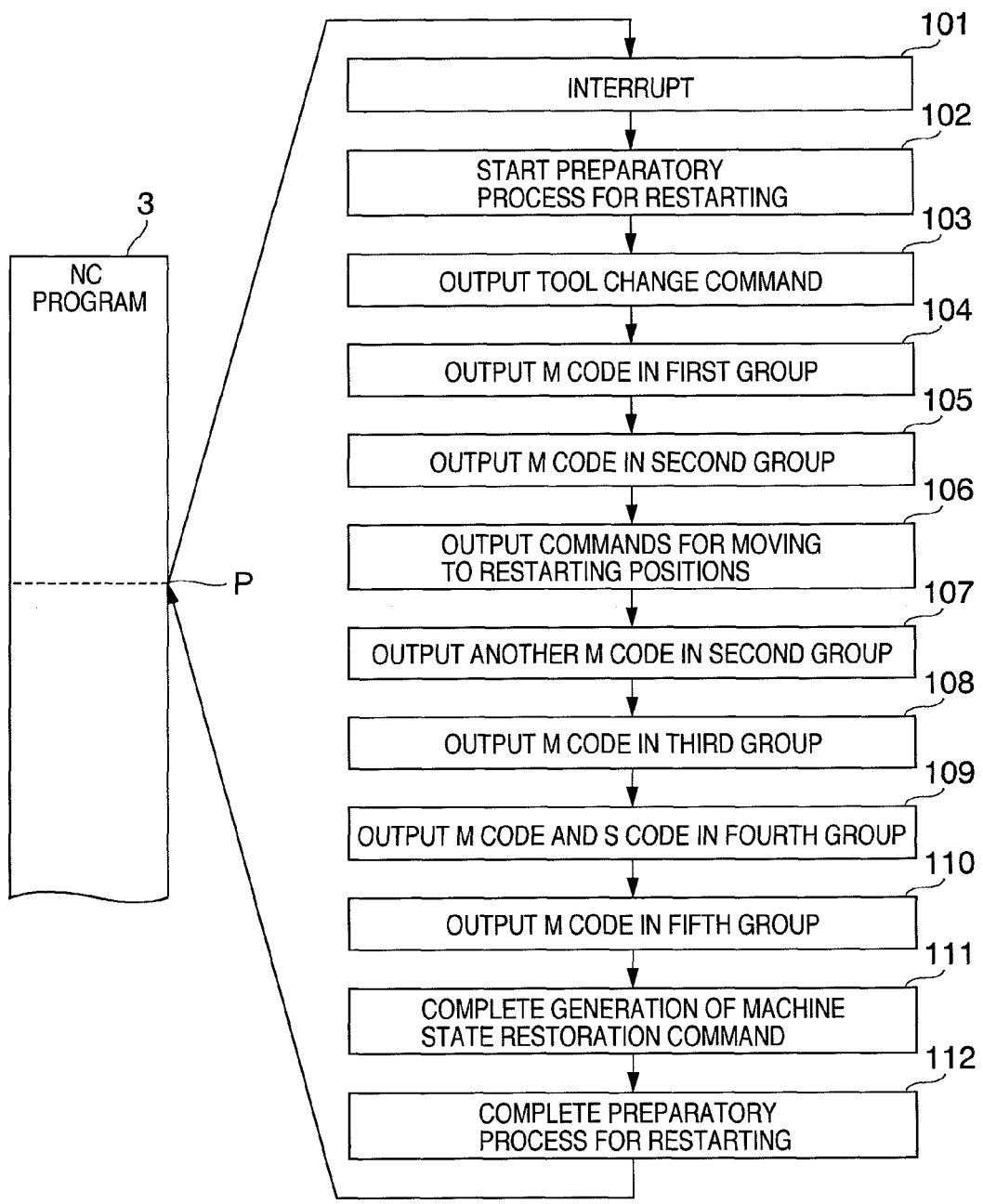
FIG. 4 is a flowchart of a method of controlling the machine tool to restart its automatic operation according to the present invention.

The control method for the machine tool will be described below mainly with reference to a flowchart shown in FIG. 4.

The machine tool is automatically operated in the machining mode to machine the workpieces by NC program commands 12 which are output from the NC apparatus 1, 1a according to the NC program 3. The machine tool can also be automatically operated in the idle mode in which the machine tool does not machine the workpiece.

After the automatic operation of the machine tool is interrupted at the interrupted point P in the machining program 3 in step 101, the automatic operation can restart, from the interrupted point P, based on the machine state restoration command 8 which is output from the machine state restoration command generating device 2.

After the machine tool is caused to interrupt its automatic operation in which the workpiece has been machined, the machine state restoration command generating device 2 starts a preparatory process for restarting the automatic operation in step 102. Then, at first a tool change command is output in step 103.

If the machine tool is a lathe or a similar machine tool, then a T command for indexing the tool rest and for changing the tool is output as the tool change command. On the other hand, if the machine tool is a machining center or a multi-axis turning center, then a T command for calling a tool and a tool change command M6 for the ATC 25 are output as the tool change command.

Thereafter, the M code group setting storage unit 30 outputs an M code in the first group, among the five main groups, to the machine state restoration command generator 9 in step 104.

Specifically, the M code group setting storage unit 30 outputs an M code for retracting or storing all components, e.g., a sensor for measuring the workpiece, relating to the sub-group included in the first group.

In step 104, therefore, all the components which would otherwise become obstacles to the movable axes are retracted in advance out of physical interference with the tool and the workpiece when they move.

Then, the M code group setting storage unit 30 outputs an M code in the second group to the machine state restoration command generator 9 in step 105.

Specifically, the M code group setting storage unit 30 outputs an M code for unclamping a movable axis with respect to only a sub-group corresponding to a movable axis to be moved to the restarting position, among the sub-groups included in the second group. If an M code for connecting the movable axis is set by a parameter, then the M code group setting storage unit 30 outputs the M code for connecting the movable axis after the command for unclamping the movable axis is completed.

Since the movable axis to be moved to the restarting position is thus unclamped, the movable axis can move to the restarting position.

Then, each of commands for moving each of movable axes to restarting positions is output in step 106. In step 106, the commands for moving the movable axes to the restarting positions are generated by either one of first through third processes to be described below.

(First Process)

The positions of the movable axes at the starting point of the restarting block, i.e., the ending point of the block of the NC program 3 upon interruption, are designated as the restarting positions to which the movable axes are to move. The order in which the movable axes are to move can be selected by a parameter which can manually be input by the operator. The movable axes can be moved stepwise safely while allowing the operator to confirm the movement of the movable axes.

If there is a danger of physical interference with an object while a movable axis is moving from the present position to the restarting position as visually observed by the operator, then the danger can be avoided by a process B1 or a process B2 to be described below.

(Process B1): The movable axis is manually moved under visual observation to a position out of physical interference while the movable axis is moving to the restarting position.

(Process B2): Before the movable axis moves, an intermediate point is established out of physical interference of the movable axis while the movable axis is moving to the restarting position. Then, the movable axis is moved from the present position via the intermediate point to the restarting position.

(Second Process)

A command for moving the movable axes to the restarting positions is automatically generated by scanning and storing a movement path after changing to a tool to be used and by using a program command pass from the present position to the program block at the start of the automatic operation restarting.

(Third Process)

Workpiece data of a three-dimensional model (3D model) of the workpiece which has been machined up to the restarting block, i.e., the interrupted point P, are acquired, and then a movement command from the present position to the restarting position is generated by using the acquired workpiece data of the 3D model of the workpiece.

In step 106, the movable axes are commanded to move to the restarting positions according to either one of the above first through third processes.

Then, the M code group setting storage unit 30 outputs another M code in the second group to the machine state restoration command generator 9 in step 107. Specifically, the M code group setting storage unit 30 outputs an M code for clamping a movable axis in a sub-group wherein the final output in the restarting block represents a clamped state, among the sub-groups included in the second group.

In step 105 and step 107, the unclamping or clamping of each of the movable axes can restart in the second group.

As a consequence, a movable axis which has been clamped upon interruption is clamped after the movable axis has moved to the restarting position, and a movable axis which has been unclamped upon interruption remains unclamped after the movable axis has moved to the restarting position.

Then, the M code group setting storage unit 30 outputs an M code in the third group to the machine state restoration command generator 9 in step 108. Specifically, the M code group setting storage unit 30 outputs the same M code as the final output in the interrupted block in the sub-group included in the third group.

Then, the M code group setting storage unit 30 outputs an M code in the fourth group to the machine state restoration command generator 9, and the main spindle state storage unit 34 outputs an S code in the fourth group to the machine state restoration command generator 9 in step 109. Specifically, the M code group setting storage unit 30 outputs the same M code as the final output in the restarting block in the sub-group included in the fourth group to the machine state restoration command generator 9, and the main spindle state storage unit 34 outputs an S code for commanding a rotational speed of the main spindle in the sub-group included in the fourth group to the machine state restoration command generator 9.

If the output M code represents a main spindle rotation command, then the M code group setting storage unit 30 outputs an M code for turning off the brake for the main shaft, which has been set by a parameter, and an M code for canceling the connection of the C-axis. The main spindle is thus allowed to restart its rotation in step 109.

Then, the M code group setting storage unit 30 outputs an M code in the fifth group to the machine state restoration command generator 9 in step 110. Specifically, the M code group setting storage unit 30 outputs the same M code as the final output in the interrupted block in the sub-group included in the fifth group.

When the procedure from step 103 to step 110 is carried out, the machine state restoration command generator 9 automatically generates the machine state restoration command 8 and outputs the generated machine state restoration command 8 to the program analyzer 7.

When the generation of the machine state restoration command 8 is completed in step 111 and other preparatory actions are finished, the preparatory process for restarting the automatic operation is completed in step 112.

After the preparatory process for restarting the automatic operation, the NC apparatus 1, 1a output NC program commands 12 based on the remaining NC program which starts from the interrupted point P in the NC program 3. The NC program commands 12, which are thus output, enable the machine tool to restart its automatic operation from the interrupted point P to machine the workpiece.

As described above, the machine state restoration command generator 9 automatically generates the machine state restoration command 8. Therefore, when the automatic operation of the machine tool restarts after the automatic operation has been interrupted halfway, the operator is not required to manually generate or correct the machine state restoration command 8.

The operator is only required to press a button or to enter a command for restarting the automatic operation, but not to perform a complex process. The machine tool restarts its automatic operation and subsequently automatically machines the workpiece continuously. Therefore, the operator does not need to be highly skilled.

Since the machine state restoration command 8 is automatically generated, the order of execution of NC program commands is prevented from being corrected in error by the operator. When the automatic operation of the machine tool restarts, the components of the machine tool are prevented from moving unexpectedly and from physically interfering with other components and members and hence from being damaged.

The method of and the apparatus for controlling a machine tool to restart its automatic operation according to the present invention are applicable to lathes, machining centers, multi-axis turning centers and turning machines.

Although a certain preferred embodiment and modifications of the present invention have been shown and described in detail, it should be understood that the present invention is not limited to the illustrated embodiment and modifications, but various changes and modifications may be made therein without departing from the scope of the appended claims.

What is claimed is:

1. A method of controlling a machine tool to restart automatic operation for machining a workpiece from an interrupted point after said machine tool, which has been automatically operated by NC program commands output from an NC apparatus, is caused to interrupt the automatic operation halfway, comprising the steps of:

classifying said NC program commands into a plurality of main groups with respect to contents of motions for changing a machine state of said machine tool by said NC program commands; and determining an order of execution of said NC program commands such that said main groups are arranged in a prescribed order of execution, for automatically generating a machine state restoration command, when the automatic operation of said machine tool restarts after the automatic operation has been interrupted halfway, wherein when said machine tool is automatically operated to machine the workpiece, said main groups comprise at least one of:

a first group including at least one sub-group having an NC program command for retracting a component which would otherwise become an obstacle to a movable axis of said machine tool when the movable axis moves;

a second group including at least one sub-group having an NC program command for clamping and unclamping the movable axis;

a third group including a sub-group having an INC program command not included in the remaining groups of said main groups, among commands required to restore the machine state of said machine tool;

a fourth group including at least one sub-group having an NC program command for rotating a main spindle on which a tool or the workpiece is mounted; and a fifth group including at least one sub-group having an NC program command for making an action immediately before the automatic operation restarts, and wherein when the automatic operation of said machine tool restarts after the automatic operation has been interrupted halfway, the order of execution of said NC program commands is determined such that said main groups are arranged in the order of the first group, the second group, the third group, the fourth group and the fifth group, for automatically generating said machine state restoration command.

2. An apparatus for controlling a machine tool to restart automatic operation for machining a workpiece from an interrupted point after said machine tool, which has been automatically operated by NC program commands output from an NC apparatus, is caused to interrupt the automatic operation halfway, said apparatus comprising:

a machine state restoration command generating device for outputting a machine state restoration command based on which said machine tool restarts the automatic operation on the workpiece from the interrupted point; and said machine state restoration command generating device comprising:

a machine state storage unit for storing a machine state of said machine tool;

a main group storage unit for storing a plurality of main groups into which NC program commands are classified with respect to contents of motions for changing the machine state of said machine tool according to said NC program commands;

an output-signal-upon-interruption storage unit for storing an output signal upon interruption of the machine state which is output from said NC apparatus; and a machine state restoration command generator for arranging said main groups output from said main group storage unit according to a prescribed order of execution based on data of the machine state output from said machine state storage unit and based on an output signal upon interruption of the machine state which is output from said output-signal-upon-interruption storage unit, for automatically generating said machine state restoration command, and for outputting the generated machine state restoration command to said NC apparatus, when the automatic operation of said machine tool restarts after the automatic operation has been interrupted halfway, wherein when said machine tool is automatically operated to machine the workpiece, said main groups comprise at least one of:

a first group including at least one sub-group having an NC program command for retracting a component which would otherwise become an obstacle to a movable axis of said machine tool when the movable axis moves;

a second group including at least one sub-group having an NC program command for clamping and unclamping the movable axis;

a third group including a sub-group having an NC program command not included in the remaining groups of said main groups, among commands required to restore the machine state;

a fourth group including at least one sub-group having an NC program command for rotating a main spindle on which a tool or the workpiece is mounted; and a fifth group including at least one sub-group having an NC program command for making an action immediately before the automatic operation restarts, and wherein when the automatic operation of said machine tool restarts after the automatic operation has been interrupted halfway, said machine state restoration command generator determines the order of execution of said NC program commands such that said main groups output from said main group storage unit are arranged in the order of the first group, the second group, the third group, the fourth group and the fifth group, for automatically generating said machine state restoration command.

3. An apparatus according to claim 2, wherein said machine state restoration command generating device is provided outside of said NC apparatus independently.

* * * * *